United States Patent Office 3,501,308

Patented Mar. 17, 1970

3,501,308

PHOTOSENSITIVE CRYSTALLINE POLYACETYLENIC SENSITIZED WITH A π-ACID

Albert H. Adelman, Columbus, Ohio, assignor to The Battelle Development Corporation, Columbus, Ohio, a corporation of Delaware No Drawing. Filed July 1, 1966, Ser. No. 562,125
Int. Cl. G03c 1/72, 5/24
U.S. Cl. 96—88 17 Claims

ABSTRACT OF THE DISCLOSURE

A radiant-energy sensitive composition of enhanced photosensitivity comprised of: a photosensitive crystalline polyacetylenic compound having a minimum of two acetylenic linkages as a conjugated system; and an organic π-acid electron acceptor in an amount effective to provide enhanced sensitivity. Preparation of the composition of enhanced photosensitivity by commingling the polyacetylenic compound and the electron acceptor; and preparing a visual image by exposing to daylight the composition of enhanced photosensitivity.

In general this invention relates to radiant-energy sensitive compositions comprising photosensitive crystalline polyacetylenic compounds for image-recording purposes. More particularly, this invention concerns enhancing the photosensitivity of these radiant-energy sensitive compositions through particular sensitizing materials and includes the enhanced photosensitive compositions and preparation.

Numerous polyacetylenic compositions of matter are reported in literature along with some observations of them undergoing color change upon exposure to light and/or ultraviolet radiation. Included among investigators reporting polyyne compositions are: Arthur Seher; Ferdinand Bohlmann and his coauthors; and E. R. H. Jones and M. C. Whiting and their coauthors. The photosensitive polyacetylenic compounds taught in the art contain a minimum of two acetylenic linkages as a conjugated system (i.e., —C≡C—C≡C—) and, with only a few exceptions, carbon atoms in alpha positions to the acetylenic carbon atoms, i.e., those carbon atoms directly connecting to the acetylenic carbon atoms, are bonded directly only to carbon and/or hydrogen atoms. These photosensitive polyacetylenic compositions of matter encompass diynes, triynes, tetraynes, higher polyynes and numerous derivatives and related compounds thereof of various chemical classes ranging from hydrocarbon compounds to acids, esters, diols, to still other compounds of other chemical classifications containing numerous and varied organic radicals stemming from the conjugated acetylenic carbon atoms, all of which are termed polyyne compounds for purposes of this invention.

As is apparent from publications of the aforementioned investigators, methods are known to the art for preparation of polyacetylenic compositions. Methods also are taught in U.S. Patents 2,816,149; 2,941,014; 3,065,283; etc. General preparative methods include: oxidative coupling or oxidative dehydrocondensation reactions of numerous terminal acetylenic compounds to prepare as desired, symmetrical and unsymmetrical polyyne compounds dehydrohalogenation reactions to provide compounds containing actylenic bonds; and variations, modifications and combinations of such two basic reactions to provide preparative routes for a multitude of polyacetylenic compositions of matter.

From the preceding description of the art and the sources therein mentioned there are apparent numerous polyyne compounds which may be used in the invention. For some there is a brief mention of photosensitivity, while for others nothing is reported as to photosensitivity. However, it is within the skill of the art to readily evaluate a polyyne's photosensitivity where the same is unknown. Thus, one needs merely to expose samples of a prepared crystalline polyacetylenic composition of matter to various forms of radiant energy and upon exposure to observe whether a visible color change occurs in the exposed composition. If a visible color change occurs upon exposure to a form of radiant energy, then the crystalline polyacetylenic composition of matter is deemed photosensitive for purposes of the present invention.

Illustrative and representative of the radiant-energy sensitive crystalline polyacetylenic compounds to which the invention is applicable are:

dimethyl ester of 11,13-tetracosadiynedioic acid;
dimethyl ester of 4,6-decadiynedioic acid;
diethyl ester of 11,13-tetracosadiynedioic acid;
dibenzyl ester of 10,12-docosadiynedioic acid;
dimethyl ester of 7,9-hexadecadiynedioic acid;
dicyclohexyl ester of 10,12-docosadiynedioic acid;
dimethyl ester of 9,11-eicosadiynedioic acid, monomethyl ester of 4,6-decadiynedioic acid;
monocyclohexyl ester of 10,12-docosadiynedioic acid;
monobenzyl ester of 10,12-docosadiynedioic acid;
monoethyl ester of 11,13-tetracosadiynedioic acid;
monomethyl ester of 10,12-docosadiynedioic acid;
monoethyl ester of 10,12-docosadiynedioic acid;
monomethyl ester of 11,13-tetracosadiynedioic acid;
mononeopentyl ester of 10,12-docosadiynedioic acid;
methyl potassium 10,12-docosadiynedioate;
methyl potassium 7,9-hexadecadiynedioate;
methyl barium 4,6-decadiynedioate;
dipotassium 7,9-hexadecadiynediote;
dipotassium 10,12-docosadiynedioate;
10,12-docosadiynedichloride;
10,12-docosadiynedibromide;
10,12-docosadiynedinitrile;
2,4-hexadiyne;
7,9-hexadecadiyne;
9,11-eicosadiyne;
11,13-tetracosadiyne;
12,14-hexacosadiyne, 11,13-hexacosadiyne;
17,19-hexatriacontadiyne;
4,6-decadiynedioic acid;
7,9-hexadecadiynedioic acid;
9,11-eicosadiynedioic acid;
10,12-docosadiynedioic acid;
11,13-tetracosadiynedioic acid;
12,14-hexacosadiynedioic acid;
12,14-octacosadiynedioic acid;
17-octadecene-9,11-dynoic acid, 2, 4-hexadiynediol;
3,5-octadiynediol;
10,12-docosadiynediol;
11,13-tetracosadiynediol;
the ditoluene-p-sulphonate of 2,4-hexadiynediol;
2,4,6-octatriyne;
2,4,6,8-decatetraynediol;
3,5,7,9-dodecatetrayne;
1,8,10,16-octadecatetrayne;
9,11,3,15-tetracosatetrayne;
1,6,8,13-tetradecatetrayne;
1,8,10,17-octadecatetrayne.

Each polyacetylenic compound in the foregoing tabulation, upon preparation in a reasonably pure, suitable crystalline state, has been found to exhibit at least some photosensitivity to at least one form of radiant energy. While specific preparations of a few are described herein by way of example, each is preparable by processes within the skill of the art by making use of teachings herein and in literature. In those instances where the polyacetylenic compound is a liquid at normal temperatures, the compound is cooled to a temperature whereat a suitable crystalline state is obtained and then exposed to the effective radiant energy while in this crystalline state. Of course, the sensitivity to radiation and the color change induced by the radiant energy vary widely among the foregoing tabulated polyynes. For some a color change requires exposure of only a fraction of a second, while for others several hours or days of exposure are needed to provide a significant visible color change with the same radiation source. For some the color change is quite striking such as from a clear or white to a deep or intense purple or a vivid red, while for others the change is rather drab, such as from a clear or white to a brown, or dark brown, or a black. Apparently the number of acetylenic linkages in the polyyne compound influence the particular color change with diynes going to blue, or purple, or reds and the triynes, tetraynes, and higher polyynes going to browns and blacks. Characteristic of photosensitive crystalline polyacetylenic compositions of matter is their direct color transformation upon exposure to an effective form of radiant energy, with the color transformation such as to provide a visible image.

In addition to the foregoing tabulated photosensitive crystalline polyacetylenic compositions of matter, one also can synthesize other polyacetylenic compounds and then determine, as aforedescribed, whether the same are photosensitive and thus of utility in this invention. Additional polyyne compounds reportedly possessing some photosensitivity are described in the literature. They can be prepared as described by the literature and their photosensitivity then evaluated to determine whether also of utility in this invention. Exemplary of these reported compounds are:

1,7,9,15-hexadecatetrayne;
1,5,7,11-dodecatetrayne;
1,9,11,19-eicosatetrayne;
2,4,6,8,10-dodecapentayne;
1,3,5,7,9-tridecapentayne;
2,4,6,8,10,12-tetradecahexayne;
1,3,5,7,9,11,13,15-hexadecaoctayne;
1,6,8,13,15,20,22,27-octacosaoctayne;
1,9,11,19,21,29,31,39-tetracontaoctayne;
dimethylester of 3,5-octadiynedioic acid;
4-pentynyl ester of 10,12-tridecadiynedioic acid;
ichthyothereol acetate, isanolic acid;
2,4-hexadiynedioic acid;
5,7-dodecadiynedioic acid;
1,8-dichloro-2,4,6-octatriyne;
1,10-dichloro-2,4,6,8-decatetrayne;
3,5-octadiyne-2,7-diol;
2,4,6-octatriyne-1,8-diol;
1,3,5-nonatriyne-8,9-diol;
4,6,8-nonatriyne-1,2-diol;
trans-2,3-epoxynona-4,6,8-triyne-1-ol;
trans-nona-2-ene-4,6,8-triyne-1-ol;
4,6-decadiyne-1,10-diol;
4,6,8-decatriyne-1,2-diol;
2,4,6,8-decatetrayne-1,10-diol;
3,5,7,9-dodecatetrayne-2,11-diol;
2,13-dimethyl-3,5,7,9,11-tetracosapentayne-2,13-diol;
5,7,9,11-hexadecatetrayne-4,13-diol;
diurethane of 4,6-decadiyne-1,10-diol.

Radiant energy, as used herein in regard to crystalline polyacetylenic compositions of matter, is intended to include numerous variant forms or radiant energy encompassing not only the ultraviolet and visible regions (i.e., actinic radiation) and infrared region of the electromagnetic spectrum, but also electron beam such as developed by cathode ray guns, also gamma rays, X-rays, beta rays, electrical corona discharge, and other forms of corpuscular and/or wave-like energy generally deemed to be radiant energy. The various individual crystalline polyacetylenic compositions of concern generally are not responsive to all forms of radiant energy, but selectively respond to at least one or more of the several variant forms of radiant energy. Within the numerous and varied useful crystalline polyacetylenic compositions of matter of concern, some respond rapidly and selectively to certain radiant energy forms and slowly or not at all to other forms of radiant energy while still others respond selectively to still other forms of radiant energy and not to other forms. Most frequently response to a particular form of radiant energy is greatest and most rapid at particular narrow regions and wavelengths of the electromagnetic spectrum, as will be apparent from what follows:

Depending on particular requirements for a desired application, such as temperature of use, radiant energy form employed, desired speed of response, desired color of image, and the like, there presently is available a wide selection of useful photosensitive crystalline polyacetylenic compositions of matter for use in image-recording applications. However, the versatility and utility of photosensitive crystalline polyacetylenic compositions in image-recording applications could be greatly increased were one able to sensitize these polyyne compounds so that they would be more photosensitive and induce a color change upon exposure to additional or other forms of radiant energy other than those to which they respond initially in the absence of a sensitizing material. Desirably also an increase in speed of response to the radiant energy would be advantageous. Thus, for example, it is apparent tthat sensitization of a particular polyyne compound, which in an unsensitized form is photosensitive principally only to ultraviolet radiation, so that its sensitized composition is sensitive to normal daylight or visual light is particularly advantageous in that normal daylight photography and the like are possible. Likewise, to provide a sensitized polyyne compositions comprising a photosensitive crystalline polyacet-sensitized polyyne compound component would permit image recording to proceed more rapidly.

Accordingly, it is an object of the invention to provide enhancement of the sensitivity of radiant-energy sensitive crystalline polyacetylenic compositions of matter. It is another object to provide useful sensitized compositions comprising a photosensitive crystalline polyacetylenic compound and an organic $\pi$-acid electron acceptor as a sensitizing material. A further object is to provide processes of preparation of these sensitized compositions, of employment of the same in image-recording applications, and of processing exposed senstized compositions in various applications. All the foregoing and other objects will be apparent from that which follows:

The present invention broadly resides in enhancement of the photosensitivity of radiant-energy sensitive crystalline polyacetylenic compositions of matter through sensitizing materials which are organic $\pi$-acid electron acceptors. It includes sensitized compositions comprising at least one photosensitive crystalline polyacetylenic compound and at least one organic $\pi$-acid electron acceptor and preparation of the sensitized compositions by commingling of the polyacetylenic compound and the acceptor sensitizer material. It also encompasses employment of the sensitized compositions in image-recording applications and their processing after exposure.

Numerous representative and illustrative photosensitive crystalline polyacetylenic compositions of matter of utility for purposes of the present invention already have been described, named, and defined. Preferred for practice of the invention are those particular polyyne compounds for which there follows illustrative preparations thereof and specific examples of the same employed in sensitized compositions.

In the art of molecular complexes, sometimes called charge-transfer complexes or donor-acceptor complexes, formed by weak interaction of certain classes of organic substances, functioning as electron donors, with other substances which act as electron acceptors, there are recognized categories of donor and acceptor components classed as π-donors and π-acceptors in that their electrons available for sharing are those contained in their π molecular orbitals (G. Briegleb, "Elektronen-Donator-Acceptor-Komplexe," Springer-Verlag, Berlin-Göttingingen-Heidelberg, 1961; R. S. Mulliken and W. B. Person, "Donor-Acceptor Complexes," Annual Review of Physical Chemistry, volume 13, 1962, pages 105–126). The category of π-donors "includes alkenes, alkynes, aromatic hydrocarbons, and their substitution products" (L. J. Andrews and R. M. Keefer, "Molecular Complexes in Organic Chemistry," Holden-Day Inc., San Francisco, California (1964), page 2). The complexes, adducts or coordination complexes formed by π-donors with π-acceptors are called π-complexes and in some instances have been isolated as molecular compounds. The acceptors, which interact with these π-donors, to form π-complexes are called π-acids, or frequently just π-acceptors. While σ-acceptors and both inorganic and organic π-acid electron acceptors are recognized, the present invention only is concerned with organic π-acid electron acceptors.

In the present invention, the useful sensitizing materials for photosensitive crystalline polyacetylenic compounds are organic π-acid electron acceptors, and they are so designated herein. The presence of organic π-acid electron acceptors have been been found to enhance the photosensitivity of radiant-energy sensitive crystalline polyacetylinic compositions of matter. In contrast, the presence of numerous other substances, including σ-acceptors and inorganic π-acceptors, have given no noticeable enhancement of photosensitivity of radiant-energy sensitive crystalline polyacetylenic compositions of matter. Whether the organic π-acid electron acceptors function as π-acceptors, whether the polyacetylenic compositions function as π-donors, and whether they interact, and if so, and form π-complexes have not been established. However, whatever the specific mechanism of the enhanced photosensitivity, it has been shown and is taught herein in accordance with this invention that photosensitivity of radiant-energy sensitive crystalline polyacetylenic compositions are enhanced by commingling of an organic π-acid electron acceptor and the polyyne compound, and it is not intended to otherwise limit this invention as to any how, why, and wherefor of the enhanced photosensitivity found to occur other than that explicitly taught and claimed herein.

Numerous organic π-acid electron acceptors are known. Each tried to date has provided at least some enhancement of the photosensitivity of a radiant-energy sensitive crystalline polyacetylenic compound. In general, they are organic in nature by including a structure containing carbon with many being aromatic and/or ethylenic in nature. Their structure also usually includes highly electronegative substituents. Illustrative and representative of those found useful, but not necessarily inclusive of all useful organic π-acid electron acceptors, are: tetrachloroquinone (chloranil; tetracyclanoethylene (TCE); pyromellitonitrile; 1,3,5-trinitrobenzene (TNB); 9(dicyanomethylene)-2,4,7-trinitrofluorene(DTF); 7,7,8,8-tetracyanoquinonedimethane (TCNQ); tetrachlorophthalic anhydride (TCPA); tetrabromophthalic anhydride (TBPA); tetraiodophthalic anhydride (TIPA); pyromellitic dianhydride. (The common name or abbreviation shown in parentheses for the preceding acceptors frequently is used by those in the art and in some instances also is used in the description and examples hereafter.) Some additional representative organic π-acid electron acceptors taught in the art and considered to be useful sensitizers for the invention are: tropylium perchlorate; tropylium tetrafluoroborate; tetranitromethane; tetrachlorethylene; acrylonitrile; methylmethacrylate; maleic anhydride; chloro-2,4-dinitrobenzene; ethyl cyanoacetate; cyclopentadiene; 2,4-dinitroresorcinol; halogenated quinones (e.g., trichloroquinone, 2,-dichloroquinone, etc.); ω-N,N-dialkylaminoalkylnitriles (e.g., ω-N,N-(dimethylaminoaceto)nitrile, ω-N,N-(diethylaminopropio)nitrile, ω-N,N-(diethylaminobutyro)nitrile, etc.).

In general, organic π-acid electron acceptors of widely ranging electron affinity have been found to be useful sensitizers. Each necessarily doesn't provide the same enhancement of the photosensitivity, although each enhances the photosensitivity. Providing of enhanced photosensitivity apparently is not dependent on whether strong or weak organic π-acid electron acceptors are employed, although generally the stronger acceptors in a particular class (e.g., tetrahalophthalic anhydrides) provide a greater sensitivity enhancement. The photosensitivity enhancement provided by the organic π-acid electron acceptor as a photosensitizer for the polyyne compound is evidenced by the sensitized composition being capable of undergoing a significant color change upon exposure to a wavelength of radiant energy other than that to which it was principally photosensitive in its unsensitized form. Usually the enhancement manifests itself by the photosensitized composition being photosensitive at a longer wavelength. For example, a polyyne compound particularly photosensitive to ultraviolet radiation of 2537 A. may possess little or no significant photosensitivity to normal daylight, since wavelengths shorter than 260 A. constitute only about 0.2 percent of the total flux reaching the earth's surface. (The composition of normal daylight from the sun's radiation is reported, for example in "Ultraviolet Radiation," L. R. Kohler, John Wiley & Sons, New York, N.Y., 2nd edition, 1965.) After commingling such a polyyne compound with an organic π-acid electron acceptor the resultant sensitized crystalline composition possesses a significant photosensitivity to normal daylight. Often this providing of significant daylight photosensitivity is accompanied by little or no appreciable loss of the polyynes initial ultraviolet photosensitivity. The photosensitivity enhancement provided by the organic π-acid electron acceptor is accompanied by a deeper color change and/or faster speed of response of the sensitized composition to effective radiant energy inducing the color change.

The sensitized compositions of the invention are prepared by commingling with each other a photosensitive crystalline polyacetylenic compound and an organic π-acid electron acceptor. This commingling should provide intimate contact between at least some employed polyacetylenic compound and acceptor.

In one embodiment of the process, solvent solutions, mixtures, emulsions, or dispersions, of the polyyne compound and the acceptor are mixed and the solvent removed from the mixture, as by volatilization thereof, to provide a resulting crystalline solid-state composition of enhanced photosensitivity. In this solvent technique and variations thereof, enhanced photosensitivity is provided whether the polyyne solution is added to the acceptor solution, whether the acceptor solution is added to the polyyne solution, whether the solvents employed are the same or different so long as they are compatible, whether only a solvent for one component (e.g., polyyne compound) is employed and the other component (e.g., acceptor) is added in its normal solid, liquid, or gaseous state.

The preferred process for preparation of the enhanced photosensitive compositions is the just-mentioned embodiment of the solvent technique. This process offers unusual advantages over other processes of preparation of the enhanced photosensitive compositions. In particular, (a) intimate commingling of the acceptor and photosensitive polyyne compound can be accomplished, and (b) preparation of useful image-receptive elements is readily accomplished in that various binder materials and the like may be included by solvation, dispersion, or emulsification in these compositions and the composition itself readily employed to coat various substrates or the like, or employed to cast or mold a suitable film, sheet, or the like, embodiments of an image-receptive element.

In the process embodiment of the solvent technique not all solvents for the polyyne compound or the acceptor are equally effective in the enhancement produced by the acceptor. For example, benzene which is recognized to have $\pi$-donor capabilities may be competing with the photosensitive polyyne compound for the organic $\pi$-acid electron acceptor and thus reduce the amount of enhancement provided by a fixed amount of the acceptor. Accordingly, the preferred solvents are those lacking $\pi$-donor capability, with a particularly preferred solvent being methylene dichloride. Other representative solvents useful as solvents or media for the solutions, dispersions and emulsions of the polyyne and/or acceptor for the solvent process embodiment include; methylene trichloride; diethyl ether; carbon tetrachloride; chloroform; acetone; and other common organic solvents.

In another process embodiment, the polyyne compound and the acceptor, with or without the employment of solvent or solvents, are mixed together, brought to a fused or molten state, and then cooled to provide a resulting crystalline solid-state composition of enhanced photosensitivity.

In still another process embodiment, the polyyne compound and acceptor constituents are commingled by mixing together and subjecting to pressure sufficient to provide intimate contact between at least some of the employed polyyne compound and the acceptor. Other process embodiments also will be readily apparent to those skilled in the art from the foregoing and are useful so long as such process embodiments include a commingling of the polyyne and the acceptor constituents to provide intimate contact between at least some of the employed polyyne compound and acceptor constituents.

From minute to extremely large amounts of organic $\pi$-acid electron acceptors are useful in the sensitizing compositions. In preparing the sensitized compositions, useful and effective amounts providing enhanced photosensitivity have been as small as one part by weight of an acceptor and as large as 400 parts by weight of acceptor for each 100 parts by weight of the polyyne compound. Some enhancement of photosensitivity is found with larger and smaller amounts of the acceptor, but usually not significant and striking enhancement of photosensitivity. A generally useful and effective range is 0.1 to 400 mole percent of the acceptor for each mole of the polyyne compound. Within the range, there usually is a smaller limited range of proportions whereat enhanced photosensitivity is most significant and striking. The preferred ratio is 0.3 to 50 mole percent of the acceptor for each mole of the polyyne compound. Optimum amounts of acceptor can vary depending on the particular commingling process embodiment employed in preparing the enhanced photosensitized composition. In one instance, by a solvent-solution process embodiment, the optimum amount of acceptor was about 10 mole percent of the polyyne compound, while by the molten-fusion process embodiment the optimum amount for the same polyyne compound apparently was about 0.5 mole percent of acceptor.

Although the enhanced photosensitive composition need contain only a single photosensitive crystalline polyacetylenic compound and a single organic $\pi$-acid electron acceptor, it is within the invention's scope that more than one of each or both may be included.

For image-recording applications the enhanced photosensitive composition also usually will comprise only a portion of a practical and useful image-receptive element. In general, a useful image-receptive element will comprise the enhanced photosensitive composition and a carrier means to fixedly position the same. The carrier means can be in any of several diverse embodiments. The carrier means can comprise a binder material, such as a natural or synthetic plastic, resin, colloid or gel and the like, for example polyvinyl alcohol, gelatin, ethylene oxide polymers, etc. with crystals of the enhanced photosensitive composition suspended therein. In some applications, image-receptive elements in the form of sheets, films, and the like and comprised principally of the binder and dispersed crystals of the enhanced photosensitive composition are of great utility. Other useful image-receptive elements can comprise a substrate, for example, paper, glass, metal, polyethylene terephthalate, cellulose acetate, etc., having adhered thereto with and/or without sub- and/or over-coatings, on one or more surfaces with a binder-free coating of the enhanced photosensitive composition or a coating of dispersed crystals of the enhanced photosensitive composition in a suitable binder. The useful binders, substrates, sub- and over-coatings, and the like contemplated to be employed in the image-receptive element are those known to the art to be of suitable photographic quality for conventional image-recording elements. They are selected with due care as to compatibility with the polyyne compound and the acceptor employed and the desired image-recording application. For example, where the imaging technique requires transmission of the radiant energy through the substrate and/or binder to expose the enhanced photosensitive composition, such substrate and/or binder are chosen with due regard to their transmission characteristics of that radiant energy.

The photosensitive image-receptive element may be used in image-forming systems based on transmission-exposure techniques and reflex-exposure techniques. Thus, stencils of a material substantially nontransmissive of the radiant energy may be laid on the image-forming element with the cut-out portion of the stencil allowing the applied radiant energy to strike the element according to the desired image or images. If desired, the stencil need not contact the element with the radiant energy being projected through the cut-out portion of the stencil to strike the element. The element also can be exposed by contact or projection techniques through a two-tone image or process transparency, e.g., a process negative or positive (i.e., an image-bearing transparency consisting of areas transmissive and opaque to the radiant energy such as of a so-called line or halftone negative or positive-type transparency) or a continuous tone negative or positive. Likewise an object, whose image is to be obtained, may be placed between the radiant energy source and the element and the radiant energy striking the element will be of an image pattern dependent on the radiant energy absorption and transmission characteristics of the particular object. Reflex-exposure techniques are applicable and may be used to make photocopies of printed or typed copy. Reflex-exposure techniques are particularly useful for making office copies from materials having messages on both sides of a page, for making images of specimens and objects, and for reproducing messages and the like.

Well-known sources, lenses and optical systems, camera arrangements, focusing and projection systems and the like for the various forms of radiant energy are useful employing the photosensitized compositions in image-forming applications, such as photography, pattern making, reproduction of written, printed, drawn, typed, and the like matter, and the recording of line graphical images by an impinging pointed beam of the radiant energy on the element with either or both the element and pointed beam guided or traveling to trace the image. The resultant images are directly formed print-out images in that they can be seen by the human eye to be a visibly distinctly different color than the unirradiated crystalline photosensitive composition.

For illustrative purpose there are presented examples of specific preparations of some photosensitive crystalline polyacetylenic compounds, which are useful in the invention.

EXAMPLE A

11,13-tetracosadiyne 1.25 moles of bromine are added dropwise to a cooled solution of 1.13 moles of 1-dodecene in one liter of carbon disulfide. After all the bromine is added, there is added 1-dodecene in a small amount sufficient to remove the red color from the slight bromine excess. The carbon disulfide is removed by distillation and the remaining yellow liquid is taken up in ether, washed with aqueous 10% ethanol and dried over magnesium sulfate. The ether is removed by distillation and the remaining, about 1 mole, of crude 1,2-dibromodecane used for dehydrobromination. This crude, 1,2-dibromodecane is mixed with 5.3 moles of aqueous 85% potassium hydroxide solution and under a nitrogen atmosphere heated to 170°–200° C. for 3 hours. The first half-hour of heating is under reflux, while during the latter 2½ hours there is collected about 200 ml. of a condensate, a cloudy colorless liquid. Ether and water are added to the distillate and, after thorough mixing, the ether layer is separated and dried over sodium sulfate. The dried ether solution then is stripped of ether and followed by a vacuum distillation with a 19.4 grams fraction collected between 43°–50° C. at 0.5 mm. Hg pressure and a 68.3 grams fraction collected between 49°–62° C. at 0.6–1.2 mm. Hg pressure, each fraction being identified by infrared techniques to be crude 1-dodecyne.

Two grams of cuprous chloride and 2.4 grams of N,N,N',N' - tetramethylethylene - diamine are mixed with 400 ml. of isopropanol and oxygen bubbled through the stirred mixture for 15 minutes. Whereupon 24 grams of crude 1-dodecyne are added. The stirring and bubbling addition of oxygen are continued for 14 hours with the reactant mixture at about 35° C. and then for 19½ hours with the reactant mixture at 50° C. At this time the isopropanol is stripped off under vacuum at 40°–50° C. The remaining material then repeatedly is mixed with 200 ml. aliquots of petroleum ether (B.R. 30°–60° C.) which successively are filtered therefrom until a colorless filtrate is obtained. The filtrates are combined and washed several times with aqueous 10% hydrochloric acid. The washed petroleum ether solution then is vacuum stripped of petroleum ether to leave a slightly yellow liquid product.

This product is mixed with ether and permitted to stand 16 hours at about 0° C. A crystalline material, which formed in the ether solution, is separated by a rapid filtration of the cold solution, dried under magnesium sulfate, and found to weigh 19.4 grams. The ether filtrate is concentrated by vacuum stripping and is filtered, to obtain a second crop of precipitated crystalline material, weighing 7.1 grams after drying under magnesium sulfate. The total yield obtained is 26.5 grams of 11,13-tetracosadiyne. The 11,13-tetracosadiyne, when cooled to about 10° C., crystallizes and in this crystalline state is significantly photosensitive to ultraviolet light of a wavelength of 2537 A. in that upon an exposure of only a few seconds thereto it changes from white to colorless crystals to a blue-purplish color. Crystalline 11,13-tetracosadiyne cooled to 10° C. upon exposure for a few seconds to diffuse normal daylight and even bright sunlight undergoes no significant color change.

EXAMPLE B

Dimethyl ester of 11,13-tetracosadiynedioic acid

A mixture of 100 grams of a commercially available lithium acetylide ethylene diamine complex and 400 ml. of dimethyl sulfoxide is stirred in a dry one-liter flask under an atmosphere of dry nitrogen. After one hour, 40 grams of omega-bromodecanoic acid dissolved in 100 ml. of dimethyl sulfoxide are added dropwise into the one-liter flask while maintaining the temperature of the reaction mixture to below 35° C. by means of an ice bath. Upon completion of the addition, stirring is continued and the temperature held at 32° to 36° C. for approximately 14 hours. The resulting dark-colored reaction mixture is cooled to 10° C., acidified with aqueous 6 N HCl and extracted with three 300 ml. portions of ether. The combined ether extracts are washed with aqueous 1 N HCl, water, and aqueous saturated sodium chloride solution and then dried over magnesium sulfate and activated charcoal. After filtering, the ether is removed under reduced pressure and the resulting syrupy liquid crystallized from petroleum ether (B.R. 30°–60° C.). The product is distilled under vacuum and the fraction collected between 155°–161° C. at 1 mm. of mercury pressure is recrystallized from petroleum ether (B.R. 30°–60° C.). The yield is 20 grams of 11-dodecynoic acid, M.P. 44°–46° C. Small portions of unreacted omega-bromodecanoic acid, 10 dodecynoic acid and 11-docosaynedioic acid are also identifiable in the product.

Twenty grams of the aforeprepared 11-dodecynoic acid product are dissolved in 100 ml. of boron trichloride-methanol solution (10% w./v.) and the solution heated to 60° C. After 10 minutes the solution is poured into 200 ml. of ice water and extracted with three 50 ml. portions of petroleum ether (B.R. 30°–60° C.). The combined extracts are washed with water and dried over magnesium sulfate. Filtration and removal of the solvent yields 10 grams of a colorless liquid, methyl 11-dodecynoate, B.P. 49–50° C. at 0.3 mm. Hg pressure.

Oxygen is bubbled through a stirred mixture of 3 grams of methyl 11-dodecynoate, 0.4 gram of cuprous chloride, and 0.5 gram of tetramethylene diamine in 60 ml. of isopropyl alcohol maintained at 40° C. for 14 hours. The alcohol is removed under reduced pressure and the residue triturated with ether and filtered. The filtrate is treated with activated charcoal to remove remaining color and then cooled. The resulting crystalline product is collected by filtration and dried, yielding 2.8 grams of dimethyl ester of 11,13 - tetracosadiynedioic acid, M.P. 39.5°–40.5° C.

$C\underline{H}_3O\overset{\overset{O}{\|}}{C}—$ 220 c.p.s., singlet (5.8)

$—C\underline{H}_2\overset{\overset{O}{\|}}{C}—O—$ and $—C\underline{H}_2—C\equiv C—$ 136 c.p.s., multiplet (8.0)

$—C—C\underline{H}_2—C—$ 77 c.p.s., broad singlet (28)

(In this example and other examples, which follow, the nuclear magnetic resonance (N.M.R.) spectra are obtained on a Varian Associates HR–60 spectrometer in deuteriochloroform solution. Chemical shifts are reported in cycles per second downfield from the internal standard tetramethyl silane at 60 mc./sec. The number in parenthesis is the relative area of the resonance.) The prepared crystalline dimethyl ester of 11,13 - tetracosadiynedioic acid is radiant-energy sensitive in that an exposure of less than a few seconds to ultraviolet radiation of 2537 A. induces it to change color to a dark purplish-blue color. No significant color change is noted in the prepared crystalline dimethyl ester of 11,13-tetracosadiynedioic acid in the absence of light and also in the presence of normal outdoor daylight for exposures of up to several seconds.

EXAMPLE C

Dimethyl ester of 10,12-docosadiynedioic acid

Two hundred grams of a commercially available 10-undecynoic acid is heated in 600 ml. of boron trichloride-methanol solution (10% w./v.) to 60° C. Ten minutes after the solution becomes clear it is poured into one liter of ice water and extracted with three 400 ml. portions of petroleum ether (B.R. 30°–60° C.). The combined petroleum ether extracts are washed with two 200 ml. portions of water and dried over magnesium sulfate. Filtration and removal of the petroleum ether under reduced pressure yields 213 grams of the colorless liquid, methyl 10-undecynoate, B.P. 106–7° C. at 2.5 mm. Hg.

Into a 5-liter, three-neck flask are placed 20 grams of cuprous chloride, 24 grams N,N,N',N'-tetramethylethylenediamine (TMEDA), 2400 ml. of methanol and the 213 grams of the aforeprepared methyl 10-undecynoate. The reaction mixture is stirred vigorously while oxygen is bubbled therethrough. The temperature of the reaction mixture is maintained below 45° C. by occasional cooling with an ice-bath during the first hour of the reaction. After approximately 12 hours, the stirring and oxygen flow are discontinued and the methanol removed using a rotary evaporator and reduced pressure. The residue is extracted with four 300 ml. portions of petroleum ether (B.R. 30°–60° C.) and the resulting bluish solution washed with five 100 ml. portions of an aqueous 4% hydrochloric acid solution and followed by washing with two 200 ml. portions of water. The resulting colorless petroleum ether solution is dried over magnesium sulfate. The magnesium sulfate is removed by filtration and the filtrate concentrated to about 800 ml. and cooled. The resulting white crystalline product is collected by filtration and dried yielding 185 grams of dimethylester of 10,12-docosadiynedioic acid, M.P. 41–42° C.

N.M.R. spectrum:

$C\underline{H}_3O—\overset{O}{\overset{\|}{C}}—$ 220 c.p.s., singlet (6.1)

$—C\underline{H}_2C—O—$ and $—C\underline{H}_2—C{\equiv}C—$ 136 c.p.s., multiplet (7.8)

$—C—C\underline{H}_2—C—$ 80 c.p.s., broad singlet (24)

The prepared crystalline polyyne dimethyl ester of this example is not as radiant-energy sensitive to ultraviolet radiation as the prepared polyyne crystalline dimethyl ester of Example B.

EXAMPLE D

Monomethyl ester of 10,12-docosadiynedioic acid

Two liters of methanol are poured into a 5-liter flask followed by 185 grams of the dimethyl ester of 10,12-docosadiynedioic acid. The mixture is stirred until the diester dissolves. To the resulting solution are added 509 ml. of 0.928 N barium hydroxide-methanol solution. The reaction mixture is stirred at room temperature for 24 hours. The precipitated barium salt is removed by filtration and washed with methanol. The methanol filtrates are concentrated and filtered until no further barium salt can be obtained. The barium salt is triturated under 500 ml. of 1 N HCl and the resulting mixture extracted with three 300 ml. portions of ether. The combined ether extracts are washed with 200 ml. of water and dried over magnesium sulfate. After removal of the magnesium sulfate by filtration and the ether by reduced pressure distillation, the resulting solid is recrystallized from petroleum ether (B.R. 30°–60° C.). The crystalline product is collected by filtration, washed with cold petroleum ether and dried. A conversion to 118 grams of monomethyl ester of 10,12-docosadiynedioic acid, M.P. 61°–62° C., is obtained.

N.M.R. spectrum:

$C\underline{H}_3O\overset{O}{\overset{\|}{C}}—$ 220 c.p.s., singlet (3.1)

$—C\underline{H}_2\overset{O}{\overset{\|}{C}}—O—$ and $—C\underline{H}_2—C{\equiv}C—$ 137 c.p.s., multiplet (7.9)

$—C—C\underline{H}_2—C—$ 80 c.p.s., broad singlet (24)

$—\overset{O}{\overset{\|}{C}}O\underline{H}$ 619 c.p.s., broad singlet (1.1)

In addition, 18 grams of unsaponified dimethyl ester and 8 grams of the diacid are isolated and recovered. The prepared crystalline monomethyl ester of 10,12-docosadiynedioic acid is radiant-energy sensitive in that an exposure to ultraviolet radiation of 2537 A. of less than a few seconds induces it to change to a dark purplish-blue color. In contrast, exposures of up to a minute of normal outdoor daylight induces little to no significant color change.

The infrared spectra (Perkin-Elmer 521 spectrometer) of the polyyne compounds of the preceding examples were obtained and found to be consistent with the expected absorption bands. All obtained UV spectra (Carey Model 14M) show the uniquely characteristic absorption of the diyne group ($—C{\equiv}C—C{\equiv}C—$) with maxima at 215, 225, 240 ($\epsilon$~380) and 254 m$\mu$ ($\epsilon$~230).

The specificity of the following examples is for illustrative purposes and these examples are not to be taken as limiting the invention to other than the scope defined by the appended claims.

EXAMPLE 1

Solutions of the dimethyl ester of 11,13-tetracosadiynedioic acid in a concentration of about 6% w./v. in benzene and of tetracyanoethylene (TCE) in a concentration of about 0.6% w./v. in benzene are prepared. Laboratory filter papers are impregnated with (a) the TCE-benzene solution alone, (b) the polyyne-benzene solution alone, and (c) a mixture of equal parts by volume of the TCE-benzene and polyyne-benzene solutions. The wet-impregnated filter papers then are dried in a draft of warm forced air. In the dry state the impregnated filter papers have white to light yellow appearance. When dry the papers are exposed to a Westinghouse cool white 15-watt fluorescent lamp. At an equivalent exposure time of one minute, the (a)-impregnated and dried filter paper undergoes no significant color change, the (b)-impregnated and dried filter paper changes to a blue color, and the (c)-impregnated and dried filter paper changes to a more intense blue color. Like results are obtained in several seconds exposure to outdoor diffuse daylight.

EXAMPLE 2

Example 1 is repeated except that the benzene solvent thereof is replaced by diethyl ether. A like Example 1 upon exposure, the corresponding (c)-impregnated and dried filter paper is observed to be of enhanced photosensitivity by providing a deeper, more intense, induced color in comparison to the corresponding (b)-impregnated and dried filter paper. No apparent color change is noted in the corresponding (a)-impregnated and dried filter paper. A visual comparison indicates a somewhat greater enhancement with benzene as the solvent than with diethylether as the solvent for the comparable (c)-impregnated and dried filter papers of Examples 1 and 2.

EXAMPLE 3

Example 1 is repeated with its TCE-benzene solution replaced by a chloranil-benzene solution. The filter paper, which is impregnated with a mixture of the polyyne-benzene and chloranil-benzene solutions, is of enhanced photosensitivity in comparison to the polyyne-benzene impregnated and dried filter paper upon exposure to a Westinghouse cool white 15-watt fluorescent lamp.

EXAMPLE 4

A saturated solution of tetrachlorophthalic anhydride (TCPA) in benzene is prepared. Solutions of about 10% w./v. of the dimethyl ester of 11,13-tetracosadiynedioic acid in benzene and of about 10% w./v. of the monomethyl ester of 10,12-docosadiynedioic acid in benzene are prepared. Mixtures of the TCPA-benzene solution with each of the polyyne-benzene solutions are prepared. Filter papers are impregnated with the mixtures and also, for controls, with the individual polyyne-benzene solutions. The wet papers are air dried. These dried filter papers are exposed to outdoor diffuse daylight (shaded area on a clear sunny day). Significant enhanced photosensitivity is observed in those papers prepared with the polyyne-TCPA mixtures in that in about 45 seconds they have taken on an intense bluish-purple color while the control papers are almost completely unresponsive to daylight with little to no color change thereof being observed. Significant enhanced photosensitivity also is observed in the paper prepared with the polyyne-TCPA mixture upon covering it and the control papers with a Wood's glass filter and exposing to a daylight fluorescent or ultraviolet spot lamp with the Wood's glass filter.

EXAMPLE 5

Example 4 is repeated except the TCPA-benzene solution is replaced by about a 1% w./v. solution of 1,3,5-trinitrobenzene (TNB) in benzene. Control papers and papers prepared with the polyyne-TNB mixtures, alike Example 4, are exposed to outside subdued daylight and also through the Wood's glass filter to the daylight fluorescent ultraviolet spot lamp. In each exposure instance the paper prepared with the polyyne-TNB mixtures is of significantly enhanced photosensitivity in comparison to the control papers. In a comparison by eye of the intensity of the induced color as an estimate of the speed of response at a fixed duration exposure, the polyyne-TCPA paper of Example 4 is the fastest, the polyyne-TNB paper of Example 5 is almost but not quite as fast, and the controls are almost completely unresponsive.

EXAMPLE 6

Paper is impregnated with a mixture of equal parts of a 5% w./v. solution of the monomethyl ester of 10,12-docosadiynedioic acid and a saturated solution of TCPA in benzene. After air drying, a glass lantern slide having a line image thereon is placed on top of the impregnated and dried paper and this assembly, slide side up, exposed at noon to outdoor daylight on a cloudy day. Within 35 seconds exposure the exposed paper presents a negative contact print with the line image being of a clear to slightly yellow color and the background being an intense bluish-purple color. This negative contact print then is washed in methylene trichloride and dried whereby unexposed mixture is washed from line image portions of the print and the bluish-purple background is changed to a reddish color. This washed print then is capable of examination and handling in artificial and natural daylight and the like for periods of days and up to weeks with little to no loss of the line image and image contrast in the print.

EXAMPLE 7

A solution of 15% w./v. of the monomethyl ester of 10,12-docosadiynedioic acid in benzene is prepared and mixed with a saturated solution of tetrachlorophthalic anhydride in benzene. Filter paper is impregnated with this mixutre and air dried. The paper prepared with the polyyne-TCPA mixture is exposed through a glass plate to a carbon arc. At a density level of about 21 lux the paper with the polyyne-TCPA mixture produced an image. In contrast, a diazo paper would require a density level of about 30 lux to produce an image.

EXAMPLE 8

The benzene solvent in Example 7 is replaced by methylene dichloride and Example 7 repeated with substantially equivalent enhancement results.

EXAMPLE 9

White tablet paper is impregnated with a mixture of equal parts of a solution 10% w./v. of the monomethyl ester of 10,12-docosadiynedioic acid in methylene chloride and a saturated solution of TCPA in methylene chloride, and then air dried. This prepared paper is exposed to outside daylight through an acetate-base silver-halide negative bearing a continuous-tone image. Within 90 seconds exposure the prepared paper presents a bluish-violet continuous-tone positive print. This print then is washed in methylene dichloride to fix the same by removing unexposed mixture and to convert the bluish image to a reddish color.

EXAMPLE 10

Solutions of about 10% w./v. of the monomethyl ester of 10,12-docosadiynedioic acid in methylene dichloride and in benzene are prepared. Solutions of about 1% w./v. of TCE in methylene dichloride and in benzene also are prepared. Mixtures of equal parts of the benzene and methylene dichloride solutions are made and filter papers impregnated with the same. After air-drying, the filter papers are exposed to outdoor diffuse daylight. Within less than 5 seconds of exposure the paper prepared from mixture of the methylene dichloride solutions presents a dense image. The paper prepared from mixture of the benzene solutions requires about 35 seconds exposure to provide a dense image. In contrast, papers prepared by impregnating with the solutions of the polyyne compound in benzene and in methylene dichloride present little to no apparent visible image upon like exposure to outdoor diffuse daylight for up to about 2 minutes. Papers prepared from the benzene solution mixture, from the methylene dichloride solution mixture, from the benzene solution of the polyynne compound, and from the methylene dichloride solution all provide dense images upon exposure to ultraviolet radiation of 2537 A. No appreciable loss, and possibly a gain, in ultraviolet sensitivity is noted in the commingled TCE-polyyne in comparison to the polyyne alone.

EXAMPLE 11

A solution of about 1% w./v. of 9(dicyanomethylene)-2,4,7-trinitrofluorene (DTF) in methylene dichloride is prepared. Solutions of about 10% w./v. of the monomethyl ester of 10,12-docosadiynedioic acid and of the dimethyl ester of 11,13-tetracosadiynedioic acid also are prepared. Mixtures are made of the DTF solution with each of the polyyne-solutions and paper strips impregnated with these mixtures and air dried. These paper strips are exposed to a light source rich in ultraviolet and visible light through a series of glass filters to expose successive strips to light containing successively less ultraviolet by about 15 mμ increments. It was thus established that light of wavelength as long as 370 mμ was capable of producing a color change in these strips.

EXAMPLE 12

A mixture of about 1% w./v. of DTF and 10% w./v. of the monomethyl ester of 10,12-docosadiynedioic acid in methylene dichloride is prepared and applied to coat a copper plate. The wet coating is air dried to evaporate the methylene dichloride therefrom. The dried coating is exposed to a mercury vapor sunlamp and ultraviolet spot lamp through a glass lantern slide bearing an electrical circuit image thereon. The exposure results in a negative image of the electrical circuit being formed in the coating.

EXAMPLE 13

A mixture of about 1% w./v. of DTF and 10% w./v. of the monomethyl ester of 10,12-docosadiynedioic acid is prepared. This mixture is applied to papers and the papers air dried. These papers then are exposed to a Sylvania "mercury-vapor" sunlamp through a wide-mesh cloth sample. The exposure to the sunlamp induced formation of a mesh image on the exposed papers. The imaged papers then are washed with a methylene dichloride solvent solution of pyrene, or phenanthracene, or durene, or anthracene, or like hydrocarbon. With each of such hydrocarbon solutions the blue-purple image is converted to a reddish color with the washed imaged paper now being substantially desensitized in that additional exposure to ultraviolet or sunlight induces no significant color formation in paper portions initially unexposed.

EXAMPLE 14

A series of mixtures of DTF and the monomethyl ester of 10,12-docosadiynedioic acid in methylene dichloride are prepared with ratios of DTF/polyyne compound ranging from 1:1 to 4.5:1. Each mixture is applied to paper and the papers air dried. The paper samples are then exposed to a Sylvania sunlamp and in every instance a color change to a blue-purple color was induced. At a constant exposure time and by a comparison of the exposed papers, the optimum ratio of DTF/polyyne compound for an intense photoinduced color formation in a short time appears to be 1:10.

EXAMPLE 15

A series of mixtures of DTF and the monomethyl ester of docosadiynedioic acid in ratios ranging from 0.005:1 to 4.5:1 are prepared and each mixture placed in an individual glass tube. The tubes then are placed in a sand bath and heated to about 125° C. to liquify their contents. The glass tubes then are cooled and simultaneously exposed to normal outdoor sunlight. By comparison of these tubes at a constant exposure time, the optimum ratio of DTF/polyyne compound for an intense photoinduced color formation in a short time appears to be 1:200.

EXAMPLE 16

A solution of about 1% w./v. of 7,7,8,8,-tetracyanoquinonedimethane (TCNQ) in methylene dichloride is prepared and mixed with a saturated solution of about 10% w./v. of the monomethyl ester of 10,12-docosadiynedioic acid in methylene dichloride. Paper is impregnated with this mixture and air dried. A separate sample is prepared without TCNQ. Exposure to normal outdoor daylight induces the impregnated and dried paper containing both polyyne and TCNQ to change to a blue-purple color. In the same length of time no change is seen in the paper impregnated only with the polyyne solution.

EXAMPLE 17

Example 16 is repeated with a saturated solution of tetrabromophthalic anhydride methylene dichloride replacing the TCNQ solution. Here too, an exposure to normal outdoor daylight induces the impregnated and dried paper to change to a blue-purple color.

EXAMPLE 18

Example 16 is repeated with a saturated solution of pyromellitic dianhydride replacing the TCNQ solution. Here too, an exposure to normal outdoor daylight induces the impregnated and dried paper to change to a blue-purple color.

EXAMPLE 19

A mixture of a saturated solution of tetraiodophthalic anhydride and about 10% w./v. of the monomethyl ester of 10,12-docosadiynedioic acid in methylene dichloride is prepared and paper impregnated with this mixture. After drying the paper is exposed to normal outdoor daylight. The exposure to outdoor daylight induces the paper to change to a faint blue-purple color. At the same exposure time no color change is noted in a control of paper impregnated with the polyyne compound above.

EXAMPLE 20

A mixture of about 1% w./v. solution of pyromellitonitrile in methylene dichloride and about 10% w./v. of the monomethyl ester of 10,12-docosadiynedioic acid in methylene dichloride is prepared. Paper is impregnated with this mixture. After drying, the paper is exposed to outdoor diffuse daylight. Within a few seconds the color of the paper changes to a blue-purple color.

While the invention has been described and specifically illustrated with certain material, at certain conditions, and in certain embodiments, it is to be understood that other modifications and variations will be obvious therefrom and apparent to those skilled in the art, and that all such obvious variations and modifications as fall within the true scope of the invention are intended to be encompassed within the appended claims.

What is claimed is:

1. A radiant-energy sensitive composition of enhanced photosensitivity comprised of:

(a) a photosensitive crystaalline polyacetylenic compound having a minimum of two acetylenic linkages as a conjugated system; and (b) an organic $\pi$-acid electron acceptor in an effective amount to provide enhanced photosensitivity.

2. The composition of claim 1 in which the acceptor is 9(dicyanomethylene)-2,4,7-trinitrofluorene.

3. The composition of claim 1 in which the acceptor is a tetrahalophthalic anhydride.

4. The composition of claim 1 in which the acceptor is tetracyanoethylene.

5. The composition of claim 1 in which the acceptor is 7,7,8,8-tetracyanoquinonedimethan.

6. The composition of claim 1 in which the acceptor is a trinitrobenzene.

7. The composition of claim 1 in which the photosensitive crystalline polyacetylenic compound is an ester of a diynedioic acid.

8. The composition of claim 1 in which the photosensitive crystalline polyacetylenic compound is the monomethyl ester of 10,12-docosadiynedioic acid.

9. The composition of claim 1 in which the photosensitive crystalline polyacetylenic compound is the dimethyl ester of 11,13-tetracosadiynedioic acid.

10. The composition of claim 1 in which the photosensitive crystalline polyacetylenic compound is 11,13-tetracosadiyne.

11. The composition of claim 1 containing the effective amount of from 0.3 to 50 mole percent of the acceptor for each mole of the photosensitive crystalline polyacetylenic compound.

12. A process which comprises the steps of:

(1) commingling (a) a photosensitive crystalline polyacetylenic compound having a minimum of two acetylenic linkages as a conjugated system, and (b) an organic $\pi$-acid electron acceptor; and (2) forming a crystalline solid-state composition of the commingled compound and acceptor;

whereby the formed crystalline solid-state composition is of enhanced photosensitivity in comparison with said photosensitive crystalline polyacetylenic compound.

13. The process of claim 12 in which there is commingled from 0.1 to 400 mole percent of the acceptor for each mole of the compound.

14. The process of claim 12 including a mixing of a solvent solution of (a) and (b) in step (1); and a volatilizing solvent from the commingled compound and acceptor in step (2).

15. The process of claim 12 including: a mixing of the compound and acceptor, and heating the mixture to a molten state in step (1); and a cooling the commingled compound and acceptor to solidify the same in step (2).

16. A photographic process for direct formation of a visual image, which process comprises exposing to daylight an enhanced photosensitive composition comprising a crystalline product from commingling a photosensitive crystalline polyacetylenic compound having a minimum of two acetylenic linkages as a conjugated system and an organic $\pi$-acid electron acceptor.

17. The process of claim 16 including, after the exposing, a washing with a solution of an aromatic hydrocarbon selected from the group consisting of pyrene, phenanthracene, durene, and anthracene.

References Cited

Jones et al., "Synthesis of Polyacetylenic Compound," in Nature, vol. 168, pp. 900–903, Nov. 24, 1951.

NORMAN G. TORCHIN, Primary Examiner

R. E. FICHTER, Assistant Examiner

U.S. Cl. X.R.

96—48; 250—65, 65.1

FO-1050
(5/69)

UNITED STATES PATENT OFFICE
CERTIFICATE OF CORRECTION

Patent No. 3,501,308 Dated March 17, 1970

Inventor(s) Albert H. Adelman

It is certified that error appears in the above-identified patent and that said Letters Patent are hereby corrected as shown below:

Column 2, line 52, "17-octadecene-9,11-dynoic acid," should read --17-octadecene-9,11-diynoic acid;--; line 61, "9,11,3,15-tetracosatetrayne" should read --9,11,13,15-tetracosatetrayne--.

Column 4, line 37, "comprising a photosensitive crystalline polyacet-" should read --with a speed of response greater than its un- --.

Column 5, line 58, following "chloranil" and before the semicolon (;) insert a right parenthesis mark --)--; same line, "tetracyclanoethylene" should read --tetracyanoethylene--; line 72, "chloro-2,4-" should read --1-chloro-2,4- --; line 75, "2,-dichloroquinone" should read --2,6-dichloroquinone--.

Column 6, line 25, "260" should read --2600--.

Column 10, line 32, insert --N. M. R. spectrum:--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents